(12) United States Patent
Pickett et al.

(10) Patent No.: US 6,182,770 B1
(45) Date of Patent: Feb. 6, 2001

(54) ADJUSTABLE CROP THINNER

(75) Inventors: J. Paul Pickett; Ryan Pearson, both of Burley, ID (US)

(73) Assignee: River Valley Manufacturing, Inc., Burley, ID (US)

( * ) Notice: Under 35 U.S.C. 154(b), the term of this patent shall be extended for 0 days.

(21) Appl. No.: 09/315,290

(22) Filed: May 20, 1999

(51) Int. Cl.$^7$ .................... A01B 35/16; A01B 49/00
(52) U.S. Cl. .................................................. 172/177
(58) Field of Search ...................... 47/1, 43; 171/5, 171/10, 13; 172/28, 31, 142, 149, 260, 177, 178, 172, 540, 391, 556, 546, 548, 549

(56) References Cited

U.S. PATENT DOCUMENTS

| | | | |
|---|---|---|---|
| D. 367,593 | | 3/1996 | De Larue ................................. D8/1 |
| 984,625 | * | 2/1911 | Waterman ............................. 172/587 |
| 1,642,261 | * | 9/1927 | Patterson ............................. 172/556 |
| 1,696,654 | | 12/1928 | Stem et al. ........................... 172/429 |
| 1,955,937 | | 4/1934 | Allen ...................................... 172/21 |
| 2,341,830 | * | 2/1944 | Uddenborg ........................... 172/550 |
| 2,431,963 | * | 12/1947 | Rhodenbaugh ...................... 172/556 |
| 2,485,057 | | 10/1949 | McCormick ............................ 172/43 |
| 3,101,123 | * | 8/1963 | Schmidt ................................ 172/556 |
| 3,172,482 | * | 3/1965 | Guccione ............................. 172/520 |
| 3,306,371 | * | 2/1967 | Bush ..................................... 172/540 |
| 3,401,753 | * | 9/1968 | Bezzerides et al. ................. 172/543 |
| 3,658,136 | * | 4/1972 | Ernst ...................................... 172/54 |
| 4,033,416 | | 7/1977 | Orthman ................................ 172/61 |
| 4,383,580 | | 5/1983 | Huxford ................................. 172/21 |
| 4,408,618 | | 10/1983 | Witzel ..................................... 460/80 |
| 4,412,588 | | 11/1983 | van der Lely et al. ................ 172/68 |
| 4,508,177 | * | 4/1985 | Wiser ................................... 172/177 |
| 4,578,937 | | 4/1986 | West et al. ............................ 56/130 |
| 4,616,714 | | 10/1986 | Lister ..................................... 172/21 |
| 4,817,732 | * | 4/1989 | Brown .................................. 172/548 |
| 4,840,232 | | 6/1989 | Mayer .................................... 172/21 |

(List continued on next page.)

FOREIGN PATENT DOCUMENTS

| | | | |
|---|---|---|---|
| 731 | * | of 1872 | (GB) . |
| 8180 | * | of 1894 | (GB) . |
| 3819 | * | 8/1891 | (SE) . |
| WO 96/28962 | | 9/1996 | (WO) . |

OTHER PUBLICATIONS

Photographs, common automated crop thinner.

*Primary Examiner*—Robert E. Pezzuto
*Assistant Examiner*—Son T. Nguyen
(74) *Attorney, Agent, or Firm*—Thorpe, North & Western, LLP

(57) ABSTRACT

An adjustable crop thinning device configured for mounting on an attachment frame for pulling behind an agricultural vehicle such as a tractor in a field of row crops. The attachment frame is oriented generally transverse to the direction of motion of the tractor, and comprises a plurality of generally upright rotating hubs disposed upon its rearward portion. Each hub has a plurality of elongate sweeps extending radially therefrom, each sweep having an elongate axis and a substantially planar end blade, and being configured to contact the ground with the end blade, such that the hub will rotate as the frame is pulled across the ground. The end blades are selectively rotatable about their elongate axes, whereby the aspect of their sweep through a row of crops may be adjusted. The rotating hubs are also angularly adjustable, being connected to the frame by a pivot mechanism allowing vertical and/or horizontal rotation of the orientation of the plane of the hub relative to the direction of motion of the machine. As the frame is pulled across the ground, the blades connected to the angled rotating hubs pass transversely through the row of crops, thereby periodically removing plants so as to thin the crop. The adjustable crop thinner may also be used for weeding and soil aeration in addition to thinning operations.

22 Claims, 6 Drawing Sheets

U.S. PATENT DOCUMENTS

| | | | |
|---|---|---|---|
| 4,899,828 | 2/1990 | Harris | 172/21 |
| 4,951,451 | 8/1990 | Klinner | 56/16.5 |
| 5,101,910 | 4/1992 | Dawson | 172/27 |
| 5,361,848 * | 11/1994 | Fleischer et al. | 172/140 |
| 5,586,603 | 12/1996 | Mattis | 172/21 |
| 5,704,430 * | 1/1998 | Smith et al. | 172/29 |

* cited by examiner

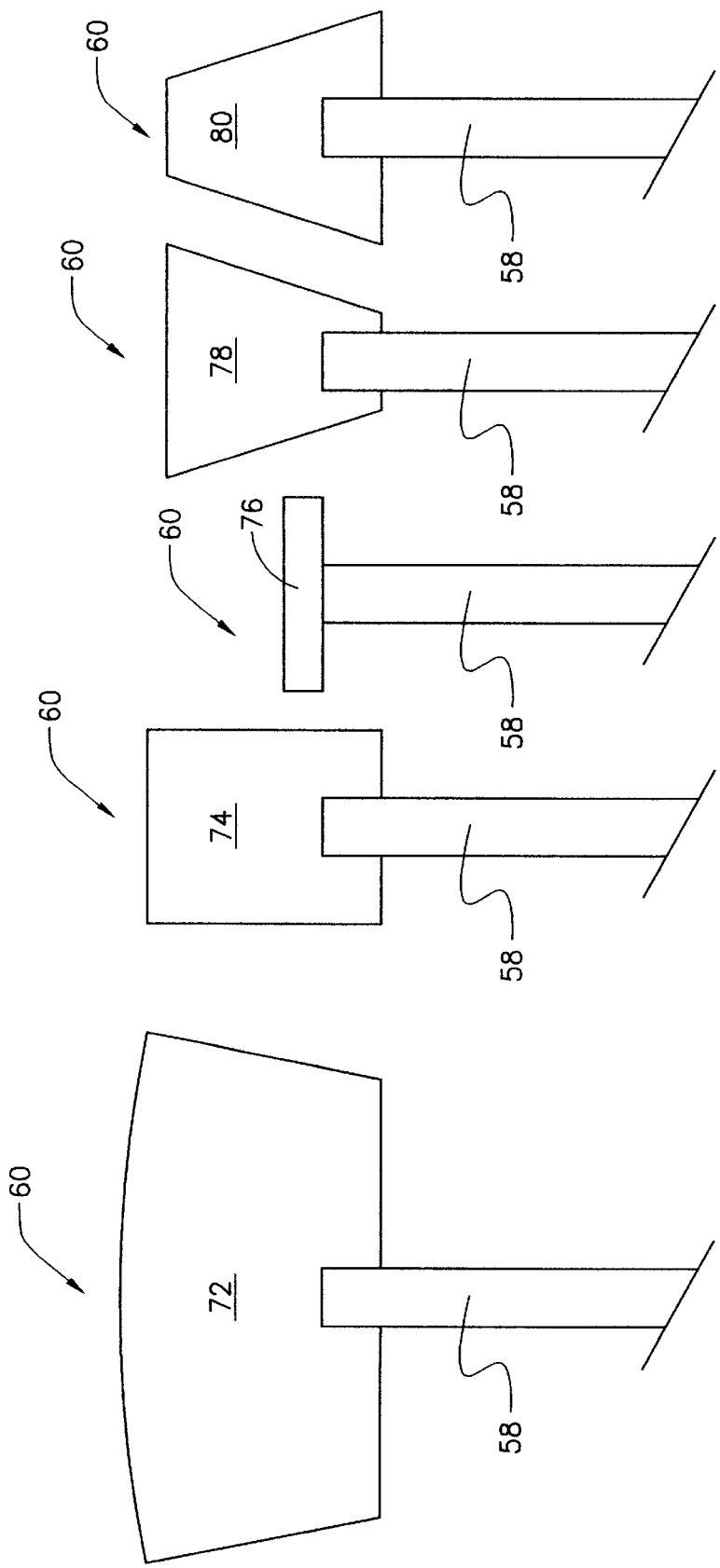

ADJUSTABLE CROP THINNER

BACKGROUND OF THE INVENTION

1. Field of the Invention

This invention relates to machines for thinning crops. More particularly, the present invention relates to an improved apparatus for thinning row crops that allows selective adjustment of both the frequency and magnitude of plant removal in a thinning operation.

2. State of the Art

The early stages of plant development are full of risks. Temperature, humidity, rainfall, seed viability, sunlight, soil fertility, and other factors all affect whether a young plant will survive to maturity. Some crops, such as sugar beets, are particularly vulnerable in their early stages. To deal with these crop risks, growers typically plant more than the desired stand of crop as insurance against early plant loss. Then, when the plants have grown enough to be likely not to succumb to the above-mentioned dangers, the growers will reduce the number of plants by thinning if the surviving plant population is too high. Thinning involves removing some portion of the young plants, preferably the smallest and least healthy, before they have a chance to grow to maturity.

Traditionally, thinning has been performed by manual labor. However, with changes in agricultural methods and labor practices, manual labor has become very expensive. Consequently, thinning machines have been developed to perform the same task. These machines fall into two categories: selective thinning machines; and random thinning machines. Selective thinning machines use on-the-fly data collection to select which plant to keep and which to eliminate. As will be appreciated, selective thinning machines tend to be quite complex, expensive, and slow. Random thinning machines simply eliminate plants based on an average population desired. Random thinners are less expensive than selective thinners, but they still tend to be slow, and they are generally nonadjustable—one machine will always thin at a certain rate, and leave a crop at a certain spacing and a certain population, regardless of the crop or other conditions. In addition, some random thinning machines operate by dragging a thinning mechanism transversely across the rows of crops. It will be apparent that such an operation is undesirable because it tends to damage crop and irrigation rows, and is especially difficult in those regions which rely upon flood irrigation. Moreover, conventional random thinning machines typically employ only one shape or size of cutting blade, which makes the machine somewhat inflexible.

It would thus be desirable to have a random crop thinner that is designed to operate parallel to crop rows, and is adjustable for a variety of crops and conditions, yet is still simple and inexpensive. It would also be desirable to have a simple, random crop thinner which employs removable blades, such that a single machine may accommodate a variety of plant types and row conditions.

OBJECTS AND SUMMARY OF THE INVENTION

It is therefore an object of the present invention to provide a random crop thinner which operates parallel to crop rows, and wherein the frequency of thinning is selectively adjustable.

It is another object of this invention to provide a random crop thinner wherein the magnitude of thinning is selectively adjustable.

It is yet another object of this invention to provide a random crop thinner wherein the thinning blades are selectively removable, and are provided in a variety of shapes and sizes.

The above and other objects are realized in a crop thinning device configured for mounting on a typical attachment for pulling behind a tractor in a field of row crops. The attachment frame is oriented generally transverse to the direction of motion of the tractor, and is provided with support wheels for supporting it upon the ground. Disposed upon the rearward portion of the attachment frame are a plurality of generally upright rotating hubs, each hub having a plurality of elongate sweeps extending radially from its perimeter, each sweep having a radial axis and a substantially planar end blade, and being configured to contact the ground with its end blade such that the hub will rotate as the frame is pulled across the ground. The end blades are selectively rotatable about their radial axes, whereby the aspect of their sweep through the row of crops may be adjusted. The rotating hubs are also pivotally connected to the frame so as to allow selective angular orientation of the plane of rotation of the hub relative to the direction of motion of the machine. As the frame is pulled across the ground, the blades connected to the rotating hubs pass angularly transversely through the row of crops and thereby thin the crop. The crop thinning device is adjustable for obtaining any desired level of thinning of a crop, and may also be advantageously used for aeration of soil and weeding.

Other objects and features of the present invention will be apparent to those skilled in the art, based on the following description, taken in combination with the accompanying drawings.

BRIEF DESCRIPTION OF THE DRAWINGS

FIGS. 3A–3E show a variety of possible sweep blade configurations for use with the sweep wheels of the present invention.

DETAILED DESCRIPTION OF THE PREFERRED EMBODIMENT

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
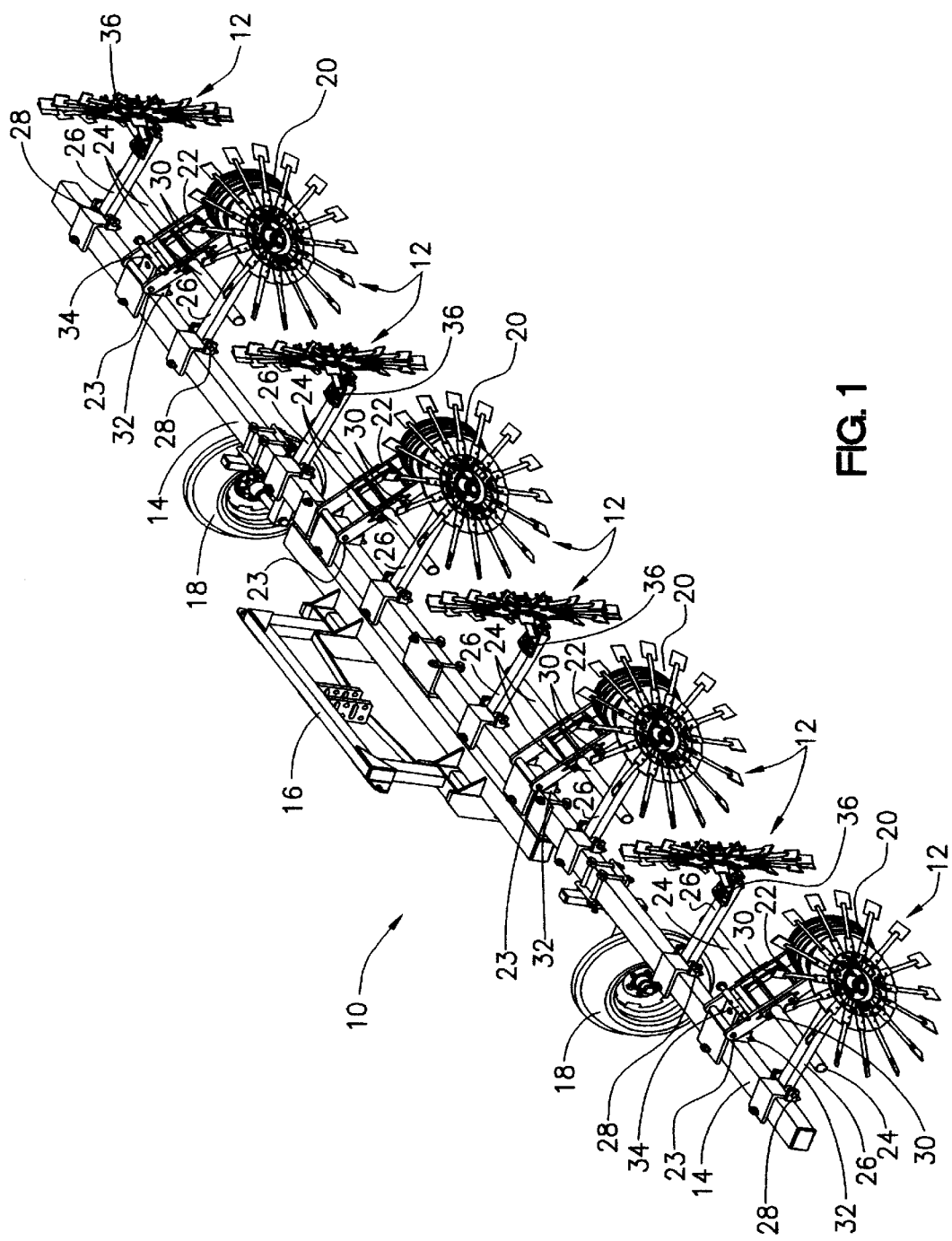
FIG. 1 provides a pictorial view of a drag attachment provided with a plurality of crop thinning wheels according to the present invention.

FIG. 1 provides a pictorial view of a thinning machine 10 provided with a plurality of crop thinners 12 according to the present invention. As depicted in this figure, the machine is configured to thin lettuce or sugar beets, and comprises eight crop thinners 12. It will be apparent that the machine may be provided with a greater or lesser number of crop thinners depending on the size of the machine 10, the spacing of crop rows, and other considerations. The machine 10 generally comprises an elongate transverse tool bar 14, having a three point hitch assembly 16 for connecting to a pulling vehicle (not shown), and machine gauge wheels 18 for supporting the tool bar 14 on the ground. The support structure associated with the machine gauge wheels 18 is typically fixedly connected to the tool bar 14 so that these wheels will provide active support to the machine 10.

A plurality of terrain following module gauge wheels 20 are disposed at the distal end of hinged module gauge wheel frames 22, which extend downwardly and backwardly from the tool bar 14. The module gauge wheel frames 22 are connected to the tool bar 14 by a module gauge wheel pivot pin mount 23 so as to be freely rotatable in a vertical plane, allowing the module gauge wheels 20 to follow the undulations of the ground. Extending sidewardly from each of the module gauge wheel frames 22 are module height control bars 24 which serve to support the module frames 26, and extend backwardly from the tool bar 14, being hingedly connected thereto by module pivot pin mounts 28. The module height control bars 24 are advantageously provided with height adjust bolts 30 which are attached to the sides of the module gauge wheel frames 22. The height adjust bolts 30 allows the location of attachment of the module height control bars 24 on the module gauge wheel frames 22 to be selectively adjusted so as to allow selectively variable penetration of the crop thinners 12 into the ground.

By virtue of this configuration, the module wheels 20 follow the ground terrain regardless of any upward or downward motion or swaying of the tool bar 14, and still support the crop thinners 12 so as to maintain their height relative to the ground regardless of irregularities in the surface of the field and any rocking, swaying, or bouncing of the towing vehicle. The height adjustability of the invention also helps the operator manage the effect of the crop thinner on plants outside the sweep assembly's path. As shown in FIG. 1, the thinning machine 10 comprises one module gauge wheel 20 and its associated frame 22 for each pair of module frames 26. While this is the preferred configuration, it will be apparent that other arrangements are possible without changing the nature or function of this invention.

Disposed below each module gauge wheel pivot pin mount 23 is a low point stop 32 for preventing the gauge wheel frames 22 from pivoting below a certain desired point. This is desirable for allowing the entire machine to be lifted off the ground for disengagement, such as when turning at the end of crop rows, or when transporting the machine to or from the field. Lifting mechanisms for doing this, such as a hydraulic lift (not shown) are well known and are typically associated with conventional three point hitch assemblies on agricultural vehicles. The right and left exterior gauge wheel frames 22 are also provided with a resting stop 34 disposed above the module gauge wheel pivot pin mount 28. This resting stop prohibits excessive upward pivoting of the gauge wheel frame 22 beyond a certain point, such that the exterior gauge wheels may operate somewhat like outriggers to laterally support the tool bar 14, and thus reduce swaying of the tool bar and the entire pulling vehicle as it travels across uneven ground.

The crop thinners 12 are attached to the module frames 26 by pivot connectors 36, which are visible relative to half of the crop thinners 12 in the view of FIG. 1. These pivot connectors 36 allow the angular orientation of the crop thinners 12 to be adjusted about a substantially vertical axis relative to the module frames 26, whereby the crop thinners 12 may be oriented at different angles relative to the motion of the machine 10. The significance of this angular adjustment will become more apparent hereafter. It will be apparent that because the pivot connectors 36 are attached to the module frames 26, which are in turn pivotally connected to the tool bar 14, the rotational adjustment of the orientation of the crop thinners 12 may not be exactly about a vertical axis if the thinning wheel support frames are not horizontal, but are inclined at some other angle.

Figure 2A:
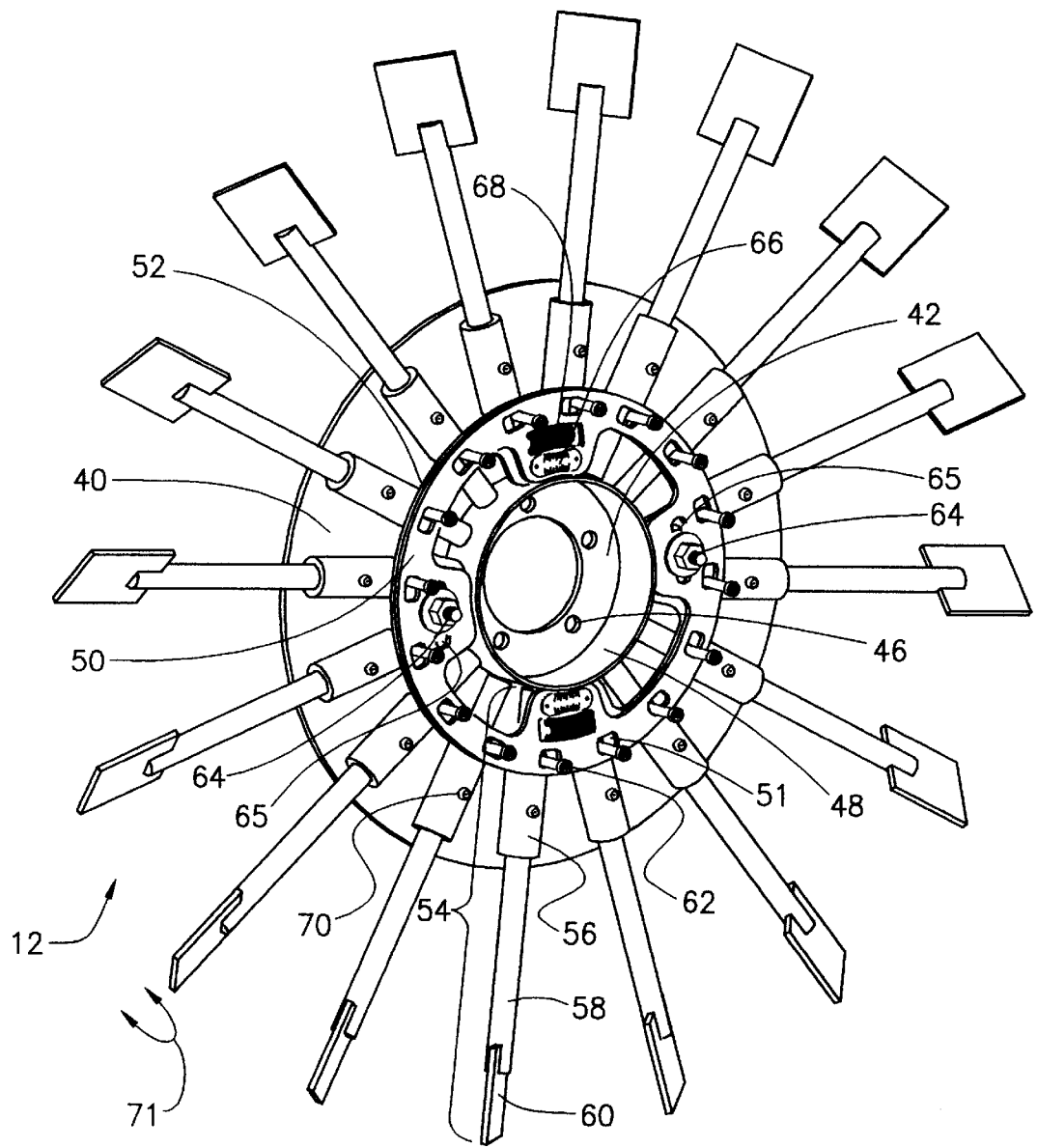
FIG. 2A shows a closeup pictorial view of a crop thinning wheel with adjustable sweeps according to the present invention.

FIG. 2A provides a closeup pictorial view of a crop thinner 12 having adjustable sweeps according to the present invention. The crop thinner 12 is generally comprised of a substantially planar sweep disc or wheel 40 having a central hub 42 with a hub pilot hole 44 and lug bolt holes 46 for allowing mounting of the crop thinner 12 onto a conventional rotating wheel hub. Disposed about the perimeter of the central hub 42 is a slip ring 48 which coaxially supports a pair of circular, substantially planar slip plates 50 and 52. The outer slip plate 50 is configured for rotation about the slip ring, the advantages of which will be come more apparent shortly.

Fixedly disposed between the inner slip plate 52 and the sweep disc 40 are a plurality of sweep assemblies 54 extending radially from the center of the wheel. Each sweep assembly 54 generally comprises a sweep bushing 56, a sweep shaft 58, and a substantially planar sweep blade 60. The sweep bushing has an elongate, generally cylindrical central opening, and is fixedly attached along its side, such as by welding, to the slots provided in the sweep disc 40. The sweep blade 60 and sweep shaft 58 are fixedly connected to each other, and are preferably made of steel. The base of the sweep shaft 58 is rotatably disposed within the central opening of the sweep bushing, and a sweep pin 62 is fixedly connected to the shaft, and extends in a direction generally perpendicular to the wheel 40 through an elongate slot 51 formed in both the outer slip plate 50 and inner slip plate 52. A pair of set bolts 64 which extend through slots 65 in the outer slip plate are provided to allow selective fixation of the outer slip plate 50 to the inner slip plate 52. A pair of graduated position indicators 66 are advantageously provided to indicate the relative angular orientation of the outer slip plate 50 and the inner slip plate 52.

Figure 2B:
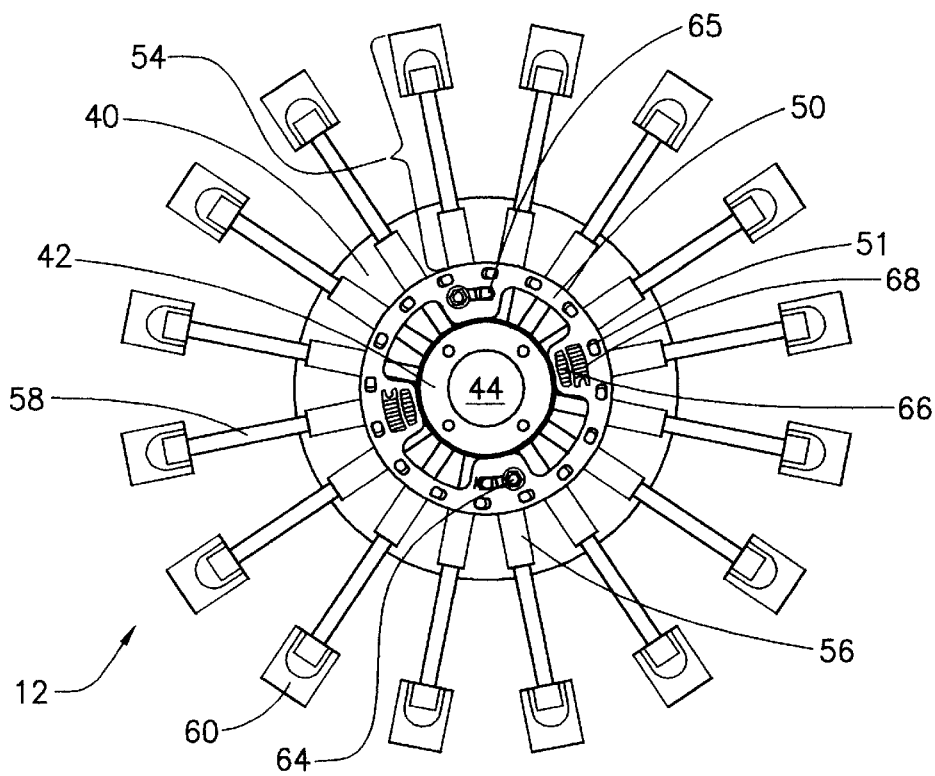
FIG. 2B shows a side elevation view of the crop thinning wheel of FIG. 2A with the sweeps oriented in the fully open position.
Figure 2C:
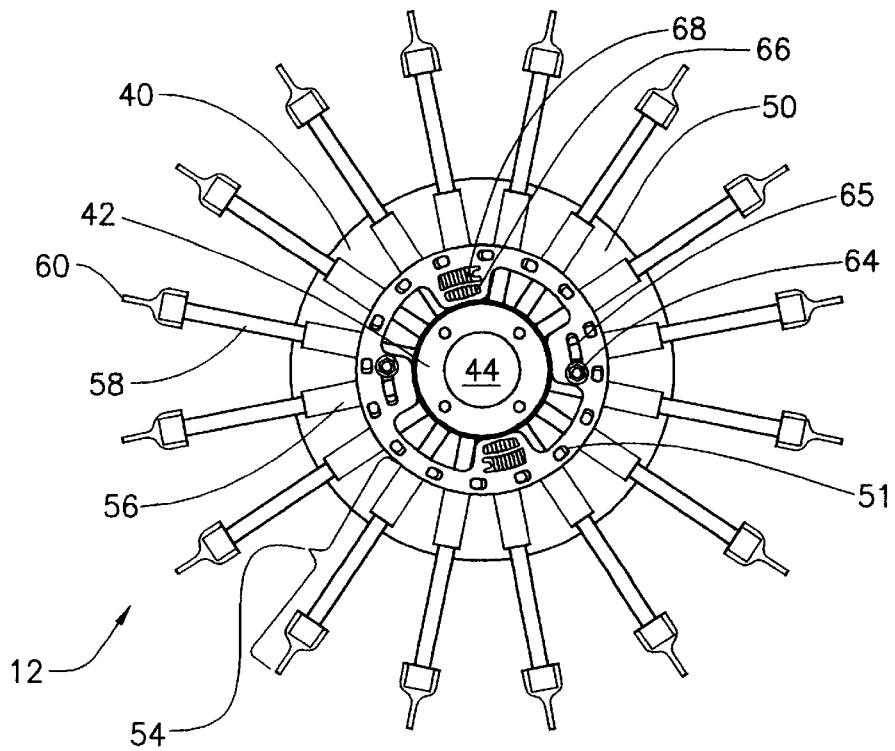
FIG. 2C shows a side elevation view of the crop thinning wheel of FIG. 2A with the sweeps oriented in the fully closed position.

The crop thinner as above-described advantageously allows a user to adjust the angle of the sweep blades 60 relative to their radial axes. This advantageous operating feature becomes more clear when viewing FIGS. 2B and 2C in combination with FIG. 2A. Shown in FIG. 2B is a side elevation view of the crop thinning wheel of FIG. 2A with the sweeps oriented in the fully open position, and FIG. 2C shows the same view with the sweeps oriented in the fully closed position. To change the orientation of the sweeps, the operator first loosens the set bolts 64 to allow rotation of the outer slip plate 50. Rotation of the outer slip plate 50 causes one side of each of the elongate slots 51 to simultaneously laterally push against the sides of all of the sweep pins 62, and thus simultaneously causes axial rotation of all sweep shafts and attached blades within the sweep bushings, as shown by arrow 71. The amount and direction of rotation of the blades can be monitored simply by viewing one of the position indicators 66, which are calibrated to indicate the relative rotational orientation of the sweep blades 60. When the desired blade angle is achieved, the user simply tightens the set bolts 64 to fix the blades in place.

As depicted in FIGS. 2A–2C, adjustment of the angle of the crop thinner blades 60 is a manual process, requiring a user to adjust the slip plate and tighten the set bolts when the crop thinner is not operating. However, it will be apparent that power adjustment means could be provided to allow adjustment of the sweep angle while the machine is in operation. For example, a servo motor and gear drive (not shown) controllable by the operator of the pulling vehicle could be provided on each thinner 12 to allow adjustment of these angles "on-the-fly." Electronic detection means could also be provided to send a signal back to the operator indicating the angle of the sweeps to assist in adjustment thereof. Thus, if thinning requirements or other conditions change, the operator need not stop to adjust sweep angles, but may make adjustments and view the results as the process proceeds. Additionally, the operator could independently adjust the sweep angles of each thinner, allowing variation of the degree of thinning both along a row, and from row to row, without stopping. It will be apparent that this arrangement could greatly speed the process of thinning while providing optimal thinning of crops in fields having varying conditions.

As shown in FIG. 2B, when in the fully closed position, the plane of each sweep blade 60 is approximately aligned with the plane of the wheel 40, thus sweeping a maximal path as the wheel is drawn across the ground. However, when the sweeps 60 are rotated to the open position as shown in FIG. 2C, the blades are oriented transverse to the plane of the wheel 40, and will therefore sweep a much narrower path as the thinner is pulled across the ground. This preferred configuration provides a 90° range of rotational adjustment of the sweeps. As shown in FIG. 2B, when the sweeps are in the fully closed position, the set bolts 64 are located at one extreme end of their corresponding slot 65. However, as shown in FIG. 2C, when the sweeps are in the fully opened position, the set bolts 64 will be located at the opposite extreme end of the same slot 65. It will be apparent that the slots 65 may be configured to be longer or shorter than shown, so as to allow rotational adjustment of the sweeps about an arc greater than 90° or one less than 90°.

As shown in FIG. 2A, an adjustment spring 68 is provided between the outer slip plate 50 and the inner slip plate 52 to assist the user in the adjustment of the sweeps. A grease zerk 70 is also associated with each sweep bushing to allow lubrication thereof. It will be apparent that because the thinning machine 10 is intended for use in dusty environments, periodic lubrication will be required to allow free rotation of the sweep shafts and blades.

FIGS. 3A–3E show a variety of possible sweep blade configurations for use with the sweep wheels of the present invention. The sweep shaft and blade assembly of the present invention is advantageously provided as a single unit, which is removable and replaceable in the sweep bushing. Consequently sweep blades of various configurations may be selectively installed in the crop thinner 12 of the present invention. The variety of sweep blade configurations shown in FIGS. 3A–3E allows the user to selectively modify the effect of the blade on the plants and soil as it passes across the row.

FIG. 3A depicts an arc sweep 72, which is broad and curved on its distal end. Because of its broad width, this sweep shape can be used to provide a complete range of thinning, up to 100%, depending on its orientation. It will be apparent that 100% thinning means completely removing a row of crops. FIG. 3B depicts a rectangular sweep 74, which is a general purpose sweep. FIG. 3C depicts a T sweep 76, which advantageously thins while minimally disturbing the soil. FIG. 3D shows a pyramid shaped sweep 78, which aggressively thins while minimally disturbing the plants. FIG. 3E shows a trapezoid sweep 80, which provides for deep soil penetration during thinning. It will be apparent that other shapes of sweeps may be used in accordance with this invention in order to obtain different thinning results as desired.

It will be apparent to those skilled in the art that the crop thinner disclosed herein may also be used for weeding and soil aeration, in addition to thinning operations. Naturally, such uses may preferably use certain sweep shapes that differ from those preferred for thinning. For example, aeration may preferably use a straight, pointed sweep, whereas weeding purposes may dictate the use of sweeps more similar to those used in thinning.

As shown in FIGS. 3A–3E, the sweep blades 60 are preferably welded to the shaft 58. It will be apparent, however, that the blade 60 may be mechanically attached to the shaft 58 in any manner that will provide a strong and rigid connection. For example, to facilitate rapid and easy removal and replacement of sweeps, a bolted connection between the shaft 58 and blade 60 may be provided, wherein the blade 60 fits into a slot (not shown) formed in the end of the shaft 58. Aligned bolt holes formed in the blade 60 and slotted portion of the shaft 58 may be provided to allow bolts to pass therethrough and secure the blade to the shaft. It will be apparent that other means of affixing the blade to the shaft may also be devised.

Figure 4A:
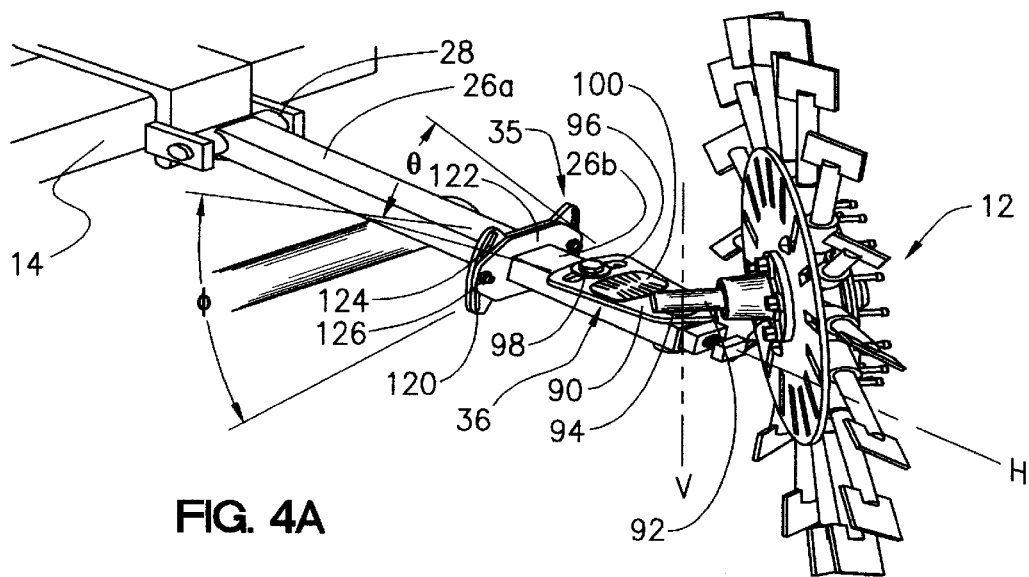
FIG. 4A provides a closeup view of the adjustable horizontal and vertical pivot connectors which connect the crop thinner to a module frame.

FIG. 4A provides a closeup view of the horizontal and vertical pivot connectors associated with each sweep. In the preferred embodiment, a vertical pivot connector 36 is provided to connect each crop thinner 12 to its associated module frame 26 to allow selective rotation of the plane of the sweep wheel about a generally vertical axis. The vertical pivot connector 36 generally comprises an adjustment plate 90 which is fixedly connected to the crop thinner axle 92 such as by welding, and pivotally connected to the module frame 26 by pivot 94, and has an arcuate adjustment slot 96, a set bolt 98, and an angular adjustment gauge 100. To adjust the angle of the plane of rotation of the crop thinner about the approximately vertical axis V, the user simply loosens the set bolt 98, rotates the adjustment plate 90 and the affixed crop thinner 12 about the pivot 94 while viewing the adjustment gauge 100, and then tightens the bolt 98 through the slot 96 so as to fix the crop thinner in place. In the preferred embodiment, the adjustment plate 90 and arcuate adjustment slot 96 are configured to allow rotational adjustment of the crop thinner through an angle φ of about 60° about the vertical axis V as shown in FIG. 4. It will be apparent that the machine may be constructed in other geometric configurations as desired so as to provide a greater or lesser degree of angular adjustability.

In an alternative embodiment of the present invention, a horizontal pivot connector 35 may also be provided to allow rotation of the plane of the sweep wheel about the axis of the module frame 26. The horizontal pivot connector 35 generally comprises an adjustment plate 120 and clamp plate 122 which are disposed within the module frame 26, dividing the module frame into an upper portion 26a and a lower portion 26b. The horizontal pivot connector 35 is preferably located between the bearing point of the module height control bar 24 and the vertical pivot connector 36 so that the module frame will always provide a flat bearing surface to rest against the module height control bar 24. The adjustment plate 120 is provided with arcuate adjustment slots 124, which mate with adjustment bolts 126 connected to the clamp plate.

Figure 4B:
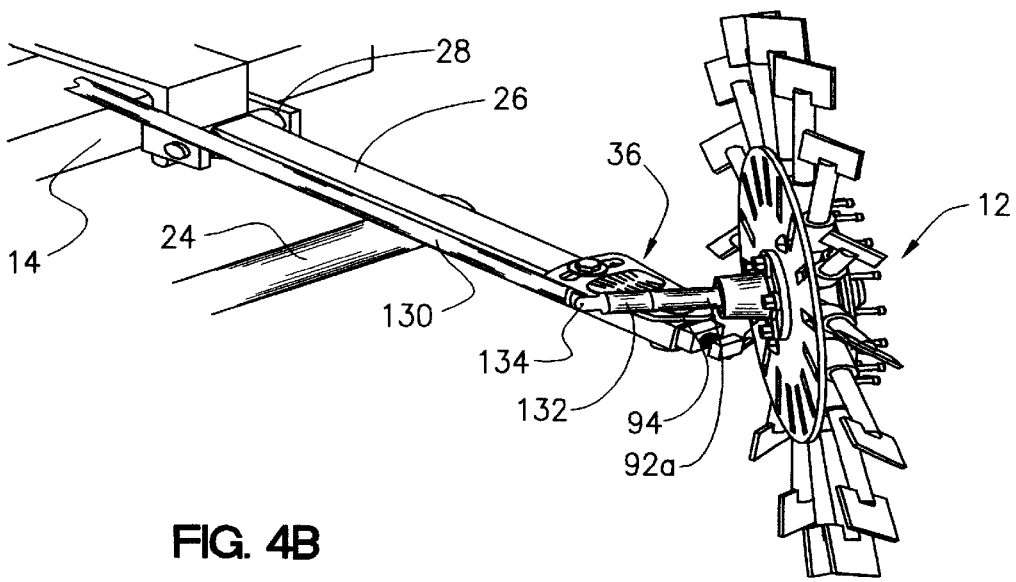
FIG. 4B provides a closeup view of the crop thinner module incorporating a power drive shaft for driving the wheel.

A rotational bearing (not shown) is disposed within the tubular steel module frame 26 between the lower section 26b and the upper section 26a so as to allow free rotation of the lower portion about horizontal axis H. To adjust the angle of the plane of rotation of the wheel 40 about the approximately horizontal axis H, the user simply loosens the adjustment bolts 126, twists the lower portion 26a of the module frame and the attached crop thinner 12 about its elongate axis H, and then tightens the adjustment bolts 126 in the slots 124 so as to fix the lower portion 26a of the module frame in place. In the preferred embodiment, the horizontal adjustment plate 120 and slots 124 are configured to allow rotational adjustment of the crop thinner through an angle $\phi$ of 90° about the approximately horizontal axis H as shown in FIG. 4A. It will be apparent that the horizontal and vertical adjustment means as illustrated in FIGS. 4A and 4B are just one of many configurations that could be used to accomplish the desired result. One skilled in the art will recognize that the invention as described herein may be constructed in many other geometric configurations so as to provide a greater of lesser degree of horizontal or vertical angular adjustability. The effect of the angular change of both the sweep blades relative to the wheel 40 and the crop thinner 12 relative to the module frame 26 will be described in more detail with regard to FIG. 5.

As with the sweep angles, adjustment of the horizontal and vertical angles of the crop thinner as described with reference to FIG. 4A is a manual process, wherein a user must manipulate the adjustment means when the crop thinner is out of operation. However, as with the sweep angles, it will be apparent from the configuration of FIG. 4A that power adjustment means could be provided to allow adjustment of both the horizontal and vertical angles while the machine is in operation. For example, servo motors controlable by the operator of the pulling vehicle could be provided to allow adjustment of these angles "on-the-fly." Thus, if thinning requirements or other conditions change, for example along the length of a row of crops, the operator need not stop to adjust the thinner, but may make adjustments without stopping. This arrangement could also greatly speed the process while providing optimal thinning of crops in fields having varying conditions.

FIG. 4B provides a closeup view of another alternative embodiment of the crop thinner module incorporating a power drive shaft 130 for driving the crop thinner 12. In this embodiment, an axle sleeve 92a is fixedly connected to the vertical adjustment plate 90, as shown in FIG. 4A. An axle 132 extends from the sleeve 92a to a connection such as a universal joint 134. The universal joint 134 connects to the drive shaft 130, which is ultimately connected to a standard power takeoff (not shown) of the agricultural vehicle. The drive shaft 130 provides rotational power to be transmitted to the crop thinner 12, so that the crop thinner may be operated at a selected speed, regardless of the towing speed of the vehicle. It will be apparent that the power drive means for driving the crop thinners 12 as illustrated is just one of many configurations that could be used to accomplish the desired result.

Figure 5:
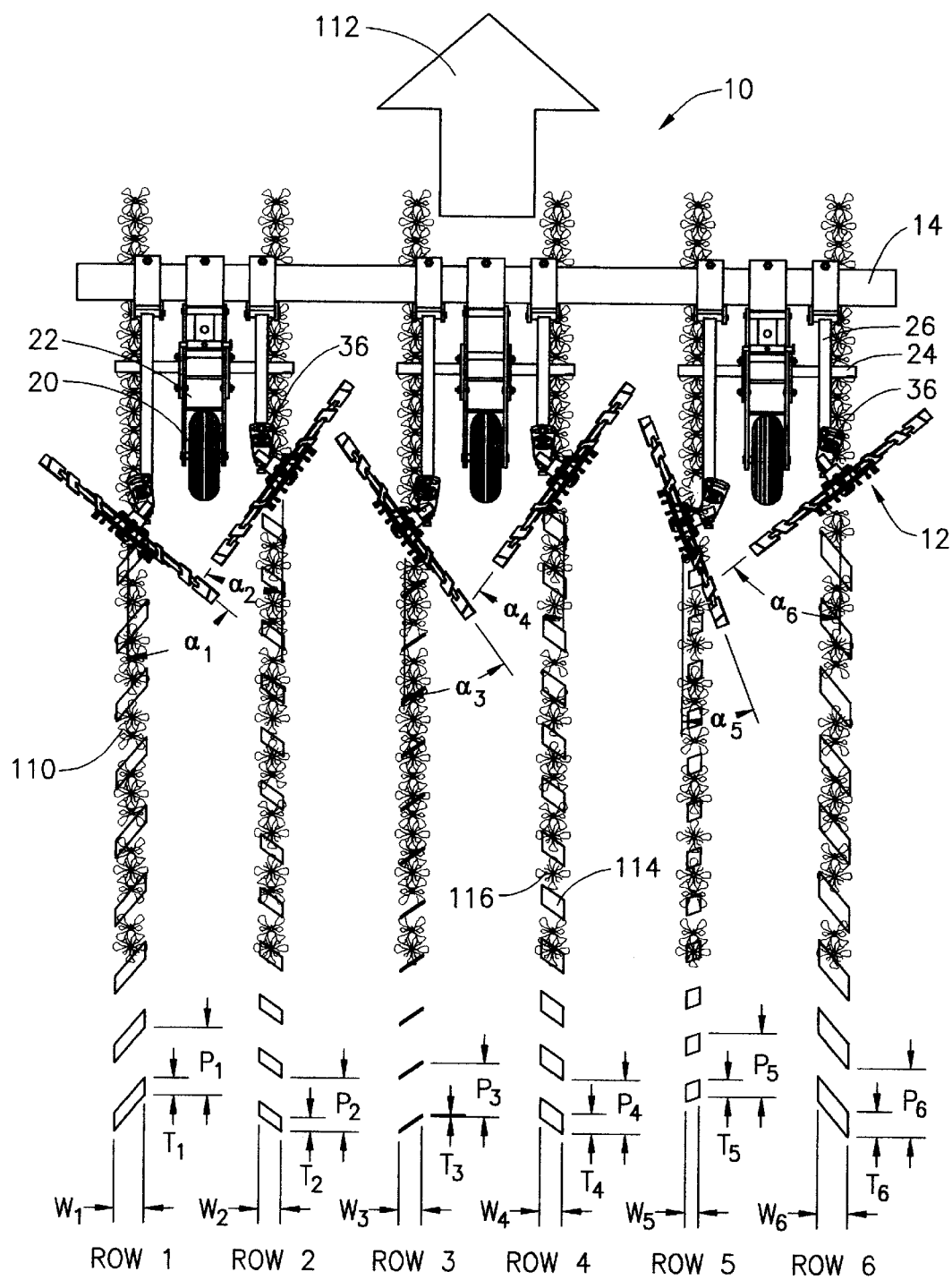
FIG. 5 shows a top view of an adjustable crop thinning attachment according to the present invention as it is dragged through a field of crops, showing the wide range of possible results of its action.

FIG. 5 shows a top view of the preferred embodiment of the adjustable crop thinning machine 10 of FIG. 1 as it is pulled through a field of crops. In this figure, each crop thinner 12 is aligned with one crop row 110 of a plurality of parallel crop rows, the vertical pivot connector 36 associated with each crop thinner 12 being oriented at a different angle $\alpha_R$, with the sweeps 60 (see FIGS. 2A–2C) likewise oriented at a variety of angles in order to show the wide range of thinning results possible. When the machine 10 is pulled in the direction of arrow 112, the crop thinners 12 rotate due to contact with the ground, forcing the sweeps 60 to dig through the crop row 110, removing plants. When the machine has passed over, a periodic series of sweep marks 114 will be left in the soil, with crops 116 between those marks left unharmed after thinning.

As noted above, the vertical adjustment plate 90 and adjustment slot 96 are preferably configured to allow rotational adjustment of the crop thinner about the vertical axis through an angle $\phi$ of about 60°. The vertical pivot plate 90 is preferably configured to provide an angle a of from 30° to 40° when the adjustment plate is fixed with the set bolt 98 tightened at approximately the longitudinal midpoint of the adjustment slot 96. Given the 60° range of rotation, this will allow the angle between the plane of the crop thinner 12 and the module frame 26 to be selectively adjusted to provide an angle $\alpha$ of from about 10° to about 70° relative to the module frame which during use is parallel to the row of crops. Angles below this range (<10°) tend to be less effective for thinning. Angles above this range (>70°) are too close to perpendicular to the direction of motion of the frame to effectively roll when pulled. Additionally, greater or lesser angles may place the crop thinners in mechanical conflict each other or with other components of the machine, depending on the dimensions and configuration thereof.

Advantageously, given the adjustability of both the sweep blade angle and the thinner wheel angle $\alpha_R$, a wide range of thinning results are possible. Table 1 below presents the thinning results for the variety of adjustment possibilities depicted in FIG. 5.

TABLE 1

Crop Thinning Results For Various Adjustment Combinations

| ROW # | $\alpha_R$ (deg.) | $P_R$ (in.) | $T_R$ (in.) | $W_R$ (in.) | % THINNED |
|---|---|---|---|---|---|
| 1 | 50 | 10 ¾ | 2 ¾ | 4 ¾ | 25.8 |
| 2 | 35 | 8 ½ | 2 ¼ | 3 ½ | 25.8 |
| 3 | 35 | 8 ½ | ¼ | 3 ½ | 4.4 |
| 4 | 35 | 8 ½ | 3 | 3 ½ | 36.4 |
| 5 | 20 | 7 ¼ | 2 ¾ | 2 | 36.4 |
| 6 | 50 | 10 ¾ | 4 | 4 ¾ | 36.4 |

It will be apparent that adjustment combinations other than those depicted in FIG. 5 and given in the table above exist, which will produce other crop thinning results as desired. It will also be apparent from the above table that more than one adjustment combination may be selected to produce the same thinning result measured as a percentage. These alternate adjustment combinations will produce sweep marks 114 of different shapes and angular orientations as shown in FIG. 5, and may advantageously be chosen depending on the crop involved and the condition of the crop rows.

By selectively choosing the machine adjustment angles, and the sweep angles, the present invention allows a user to advantageously select the degree of thinning desired, and the exact geometry of the cut made in the crop row. As an illustrative example, in a field of sugar beets, a desirable post-thin plant count may be 130 plants per 100 foot row. If the pre-thin count is 175 plants per 100 feet, the crop thinner would be adjusted to eliminate 25% of the plants. An adjustment combination such as shown in Row 1 or Row 2 of FIG. 5 would be appropriate. Additionally, if the pre-thin plant count varies from row to row, the user may selectively adjust adjacent crop thinners to cause different degrees of thinning in adjacent rows as the machine makes a single pass.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A crop thinning device configured for mounting on a frame for pulling behind a vehicle in a field of crops oriented in rows, said frame having a forward portion, a rearward portion, support wheels for supporting said frame upon the ground, and a hitch disposed on said forward portion for connecting to said vehicle, said crop thinning device comprising:

a rotatable hub configured to rotate in a generally upright plane;

a pivot connector for connecting said hub to said frame, such that the angular orientation of said hub may be adjusted so as to allow selective orientation of the plane of rotation of said hub relative to the motion of said frame;

a plurality of adjustable elongate sweeps extending radially from said hub, said sweeps having an elongate axis and a substantially planar end blade configured for contact with the ground, each of said plurality of sweeps and said substantially planar end blades being rotationally adjustable about said elongate axis; and locking means coupled to the pivot connector, configured for securing said selective angular orientation of the hub in a fixed position such that the hub will be caused to rotate as said frame is pulled across the ground to cause said end blades to pass transversely through a row of crops as said hub rotates due to the motion of the frame.

2. The crop thinning device as described in claim 1 wherein said pivot connector is configured for allowing the plane of rotation of said hub to be angularly adjusted about a substantially vertical axis.

3. The crop thinning device as described in claim 2 wherein said pivot connector is selectively adjustable to allow said hub to rotate in a plane oriented at an angle of from approximately 10° to approximately 70° relative to the row of crops.

4. The crop thinning device as described in claim 1 wherein said pivot connector is configured for allowing the plane of rotation of said hub to be angularly adjusted about a substantially horizontal axis.

5. The crop thinning device as described in claim 1 wherein said pivot connector is configured for allowing the plane of rotation of said hub to be angularly adjusted about a substantially vertical axis and about a substantially horizontal axis.

6. The crop thinning device as described in claim 1 wherein said sweeps and said substantially planar end blades are rotationally adjustable about said elongate axis through an angle of from 0° to 90° relative to the plane of rotation of said hub.

7. The crop thinning device as described in claim 1, further comprising means for simultaneously angularly adjusting all of said plurality of sweeps and said substantially planar end blades about their elongate axes.

8. The crop thinning device as described in claim 7, wherein said means for simultaneously angularly adjusting all of said plurality of sweeps and said substantially planar end blades about their elongate axes comprises:

a slip plate connected to said hub and each of said plurality of elongate sweeps, whereby rotation of said slip plate relative to said hub causes uniform axial rotation of each of said plurality of elongate sweeps; and fixation means for fixing the rotational location of said slip plate so as to fix the axial orientation of each of said sweeps.

9. The crop thinning device as described in claim 8, further comprising angular indicator means for indicating the angle of rotation of the end blades.

10. The crop thinning device as described in claim 1 wherein said substantially planar end blades are formed in a shape selected from the group consisting of rectangular, trapezoidal, pyramidal, T-shaped, and arced.

11. The crop thinning device as described in claim 1 wherein the number of elongate sweeps is selectively adjustable so as to provide variable spacing of sweeps about the perimeter of said hub.

12. The crop thinning device as described in claim 1, further comprising power drive means associated with said rotating hub, so as to cause said sweeps to pass transversely through the row of crops at a speed that is not dependent upon the speed of motion of said elongate frame and said vehicle.

13. A crop thinning device configured for mounting on an elongate frame for pulling behind a vehicle in a field of crops oriented in rows, said frame being oriented transverse to the direction of motion of said vehicle, and having a forward portion, a rearward portion, support wheels for supporting said frame upon the ground, and a hitch disposed on said forward portion for connecting to said vehicle, said crop thinning device comprising:

a rotating hub configured to rotate in a generally upright plane;

pivot connector for connecting said hub to said frame, such that the orientation of said hub may be angularly adjusted about a substantially vertical axis, so as to allow selective orientation of the plane of rotation of said hub relative to the motion of said frame;

a plurality of elongate sweeps, each sweep having an elongate axis extending radially from the perimeter of said hub and a substantially planar end blade that is angularly adjustable about said elongate axis, said sweeps configured to contact the ground with said blades such that said hub will be caused to rotate as said frame is pulled across the ground;

a slip plate connected to said hub and each of said plurality of elongate sweeps, whereby rotation of said slip plate relative to said hub causes uniform axial rotation of each of said plurality of elongate sweeps;

angular indicator means for indicating the angle of orientation of said end blades; and fixation means for fixing the rotational location of said slip plate so as to fix the axial orientation of each of said sweeps, whereby said blades may be caused to pass transversely through a row of crops as said hub rotates due to the motion of said frame, to thereby thin said crop.

14. The crop thinning device as described in claim 13 wherein said sweeps and said substantially planar end blades are angularly adjustable about said radial axis through an angle of from 0° to 90° relative to the plane of rotation of said hub.

15. The crop thinning device as described in claim 13 wherein said pivot connector is selectively adjustable to allow said hub to rotate in a plane oriented at an angle of from approximately 10° to approximately 70° relative to the row of crops.

16. The crop thinning device as described in claim 13 wherein said substantially planar end blades are formed in a shape selected from the group consisting of rectangular, trapezoidal, pyramidal, T-shaped, and arced.

17. The crop thinning device as described in claim 13 wherein the number of elongate sweeps is selectively adjustable so as to provide variable spacing of sweeps about the perimeter of said hub.

18. A method of thinning crops, comprising the steps of:
 (a) positioning a crop thinning device having a rotatable hub and a plurality of sweeps extending radially therefrom, said sweeps having elongate axes and substantially planar end blades, in alignment with a row of crops to be thinned;
 (b) orienting said hub and attached sweeps in a generally upright plane of rotation and about a generally inclined axis such that the end blades of said sweeps contact the ground approximately at the location of said row;
 (c) adjusting the angular orientation of the plane of rotation of said hub relative to the row of crops to allow adjustment of the degree of thinning;
 (d) rotationally adjusting each of said plurality of sweeps about their elongate axes, so as to change the aspect ratio of the end blades of the sweeps relative to the crop row, to thereby adjust the magnitude of thinning; and
 (e) pulling said crop thinning device forwardly through said row of crops in line with said row such that the hub will rotate as a result of contact with the ground, causing the end blades of said sweeps to pass transversely through the row of crops, to thereby thin the crop.

19. The method as described in claim 18, further comprising the step of:
 (f) simultaneously rotationally adjusting all of said plurality of sweeps about their elongate axes, so as to uniformly change the aspect ratio of the end blades of the sweeps relative to the crop row, to thereby adjust the magnitude of thinning.

20. The method as described in claim 18, further comprising the step of:
 (g) removing some of the plurality of sweeps from the hub so as to adjust the spacing at which the end blades of the sweeps will pass transversely through the row of crops.

21. The method as described in claim 18, further comprising the end blades of the step of:
 (h) driving said hub in rotational movement, whereby the sweeps pass transversely through the row of crops at a speed that is not dependent upon the speed of motion of said crop thinning device through said row.

22. The method as described in claim 21, further comprising the step of:
 (i) adjusting the speed of driving said hub so as to change the frequency at which the end blades of the sweeps will pass transversely through the row of crops, to thereby adjust the magnitude of thinning.

\* \* \* \* \*